United States Patent [19]
Wantling

[11] Patent Number: 6,066,201
[45] Date of Patent: May 23, 2000

[54] THIXOTROPIC WAX EMULSION COMPOSITIONS

[75] Inventor: Steven J. Wantling, Brandon, Miss.

[73] Assignee: Ergon, Inc., Jackson, Miss.

[21] Appl. No.: 09/188,441

[22] Filed: Nov. 9, 1998

[51] Int. Cl.[7] .................................................. C09D 191/08
[52] U.S. Cl. .............................................. 106/271; 106/10
[58] Field of Search ........................................ 106/271, 10

[56] References Cited

U.S. PATENT DOCUMENTS

| | | |
|---|---|---|
| 2,855,319 | 10/1958 | McConnaughay . |
| 3,556,827 | 1/1971 | McConnaughay . |
| 3,709,708 | 1/1973 | Strazdlns ................................ 106/216 |
| 3,847,622 | 11/1974 | Brandl et al. ............................. 106/10 |
| 3,904,428 | 9/1975 | McConnaughay . |
| 4,055,433 | 10/1977 | Morones .................................. 106/10 |
| 4,163,673 | 8/1979 | Dechert ................................... 106/11 |
| 4,433,084 | 2/1984 | Ostermeyer et al. . |
| 4,548,854 | 10/1985 | Wach ..................................... 428/138 |
| 4,732,612 | 3/1988 | Steer et al. ............................... 106/10 |
| 4,990,184 | 2/1991 | Dotson et al. ........................ 106/14.11 |
| 5,336,438 | 8/1994 | Schilling et al. . |

*Primary Examiner*—David Brunsman
*Attorney, Agent, or Firm*—Nilles & Nilles, S.C.

[57] ABSTRACT

The present invention provides a wax emulsion having thixotropic properties comprising a wax; an emulsifier, and a naphthenic oil.

9 Claims, No Drawings

THIXOTROPIC WAX EMULSION COMPOSITIONS

FIELD OF THE INVENTION

The present invention provides a wax emulsion having thixotropic properties.

BACKGROUND OF THE INVENTION

Conventional wax emulsions suffer from a number of deficiencies including high and low temperature instability, low temperature pumpability, lower than desired solids concentration, shear instability and sensitivity to contamination from various tramp products resulting in 'break-out' of the wax from the emulsion. These deficiencies are in part the result of the non-polar and hydrophobic nature of the paraffinic hydrocarbon base oils which are part of slack wax emulsions.

SUMMARY OF THE INVENTION

The present invention provide a wax emulsion having thixotropic properties comprising a wax; an emulsifier; and a naphthenic oil. According to one embodiment, the wax is slack wax, preferably derived from waxy lube distillates, preferably having an inherent oil content of not more than 10 percent by weight.

Although the amount of naphthenic oil required in a given emulsion to render the emulsion thixotropic will vary depending upon the composition of the emulsion, it is generally preferred that the emulsion comprise from about 5 to about 15 percent by weight of naphthenic oil. Preferably, the naphthenic oil has a viscosity index of less than about 80, and more preferably, less than about 30.

The present invention provides emulsions, inverse emulsions and 3-phase emulsions, although preferably the emulsion is an inverse emulsion.

As used herein the term "slack wax" means a semi refined wax derived from the distillation, deoiling and dewaxing of petroleum crude oils. Slack waxes generally have oil contents between 2 and 30 mass percent with melt points between 110 and 140° F.

As used herein, the term "naphthenic oil" means a mixture of aromatic compounds, including monocyclic and fused ring systems, both substituted and non-substituted rings, which have been rendered partially saturated such that the compounds have both aromatic and naphthenic characteristics, therefor exhibiting an affinity for both the paraffin and water phases of the finished emulsion. Preferably, the naphthenic oil is a crude distilled feedstock having little or no paraffin and having undergone catalytic hydrogenation to convert polynuclear aromatics (three or more benzene rings in a compact molecular arrangement) into partially saturated ring structures having both aromatic and naphthenic characteristics, therefor exhibiting an affinity for both the paraffin and water phases of the finished emulsion.

As used herein, the term "emulsion" means a two phase system consisting of two completely immiscible liquids, one being dispersed as fine globules in the other including colloidal dispersions of a third dissimilar solid such as wax.

As used herein, the term "inverse emulsion" means a water-in-oil emulsion where water is the discontinuous phase and the hydrocarbon is in actual contact with the work surface. In a preferred embodiment, inversion is achieved by the slow addition of water to the emulsion during the cool down phase of manufacture. As the water concentration is increased, the emulsion slowly becomes more viscous and finally reaches the inversion point, which is accompanied by rapid thinning of the system. Additional water may be added to adjust the viscosity. Inverted emulsion techniques provide for higher stability by promoting finer particle size and distribution.

As used herein, the term "3-phase emulsion" means an emulsion wherein three dissimilar substances are bound together by interfacial forces provided by the polarity of the continuous phase, i.e., water surrounded by an oil phase to which the dispersed wax phase is attached.

As used herein, the term "emulsifier" means an additive that promotes the formation of a stable emulsion of water and oil. Emulsifiers include metallic soaps and other various polar compounds, i.e., sulfonates of calcium, sodium, and others. Emulsifiers are classified as anionic or nonionic. Anionic emulsifiers include amine and fatty acid soap systems. These include several types of compounds such as alkaline salts of higher molecular weight fatty acids, fatty acids salts of divalent or trivalent metals, sulfonated alcohols and esters, and aromatic and aliphatic sulfonates. Anionic emulsifier systems that are most commonly used in the emulsification of waxes are soaps of a fatty acid and amine or wetting agent.

As used herein the term "rheopectic" means hardening or stiffening of a fluid upon shearing as through a pump.

As used herein the term "thixotropic" means the tendency of a fluid to soften or flow upon shearing as through a pump, returning to the original state or thickening upon cessation of shearing.

DETAILED DESCRIPTION OF THE INVENTION

In order to overcome the commonly identified deficiencies of currently produced slack wax emulsions, it was found that by introducing a hydrophilic and polar component to a conventional slack wax, the above described deficiencies were eliminated and a stable and usable emulsion resulted. The use of naphthenic oil having specific properties as an additive to a paraffinic wax provides polarity to form a more stable wax emulsion; increased wax flocculation as a third and stable phase; as well as thixotropic viscometrics.

While not being bound by any particular theory, it is believed that the more tenacious bonding of two dissimilar molecules, i.e., oil and water, due to the introduction of an aromatic and therefore polar hydrocarbon naphthenic oil provides an alignment site at the interface of the molecules. The polar nature of the naphthenic component encourages a tight bond not easily displaced which results in unusual stability while at the same time providing an additional potential to which the dispersed colloidal wax crystals adhere forming in essence a third phase tightly bound to the continuous oil phase in the invert wax emulsion. The result is a stable and substantially break-out free emulsion not normally associated with conventional technology.

It is further recognized that the viscosity of the oil phase is inverse to the stability and wax flocculation in the third phase due in part to a partial disruption of the potential because of molecular weight and interfacial tension. Therefore, naphthenic oils having viscosities between 40 and 5000 SUS @ 100° F. are most preferred.

When emulsified, using technology available in the art, examples of which are described below, the modified slack wax exhibits a change in flow properties from a rheopectic system normally associated with conventional slack wax emulsions, which is the main causative of poor pumpability, to a thixotropic system which promotes both pumpability of higher solids materials and offers increased emulsion stability due to the gelling affect upon cessation of shearing as through a pump.

The physical act of emulsification of the modified slack wax requires less input energy and results in a more stable emulsion with a higher than normal solids content with no separation at elevated or depressed temperatures. Moreover, a lower concentration of the emulsifier/wetting agent package is required to obtain a stable emulsion using the modified slack wax system. Additionally, the modified system has exhibited application to a wide range of emulsifiers and is not selective as is the case with standard slack wax systems.

The advantages of utilizing the modified slack wax system described herein include but are not exclusive to the following: (a) the ease of emulsification through conventional dispersion or high speed mixing devices to form a stable and usable wax emulsion; (b) the formation of a thixotropic system which permits pumpability of higher solids containing emulsions which hold in suspension the colloidal wax particles; (c) higher solids incorporation without separation which permits new uses for these materials, i.e., edge sealers; (d) shear stability through various normally used delivery systems; (e) low temperature stability without wax break-out; (f) high temperature stability without separation; (g) lower requirements, up to 50 percent less, for conventional anionic soap system emulsifier/wetting agent systems; and (h) adaptability to a wide range of emulsifier systems without break-out resulting from cross contamination.

Typical formulations include more than 50 percent slack wax and more than 40 percent water with the remainder being the naphthenic oil, wetting agent, soap system and other control additives. Differing concentrations of the components using different emulsifier systems is also recognized.

While the above advantages have been described with respect to slack wax emulsions, the present invention is not limited to such emulsion systems but may comprise any suitable hydrocarbon wax. Hydrocarbon waxes include petroleum distillate waxes, synthetic waxes and naturally-occurring waxes having melting points in the range of about 110 to about 145° F. The petroleum waxes include non-refined paraffin waxes and microcrystalline waxes such as slack waxes and scale waxes which result from dewaxing vacuum distillates, vacuum distillate residues or heavy oil distillates, and refined waxes of this class which have undergone solvent treatment, sweating, acid/alkali washing, clay treatment and hydrogenation.

It is understood that any of the above waxes may be used alone or in combination in practicing the invention Any suitable naphthenic oil which provides the necessary properties to the emulsion may be used in practicing the invention.

The emulsifiers used in the invention are preferably selected from nonionic and anionic surfactants. Specific examples of nonionic emulsifier are polyethylene glycol alkyl ether, polyethylene glycol aliphatic acid esters, polypropylene glycol alkyl ether, polypropylene glycol aliphatic acid esters, polypropylene glycol polyethylene glycol ether, and polyethylene glycol sorbitan aliphatic acid esters, more specifically Span 60, Span 80, Tween 60, Tween 80 and Emulgen 420. An example of anionic emulsifier is higher fatty acid, more specifically oleic acid. One or more of these emulsifiers may be used, preferably in an amount of 3–25 weight parts, preferably 5–20 weight parts per 100 parts of the hydrocarbon wax.

The wax emulsion of the present invention may be further blended with an antioxidant such as 2,6-di-tert-butyl-4-methylphenol (BHT), 2,2'-methylenebis(4-methyl-6-tert-butylphenol), 4,4-butylidenebis(3-methyl-6-tert-butylphenol), 4,4'-thiobis(3-methyl-6-tert-butylphenol), 2,2'-thiobis(4-methyl-6-tert-butylphenol), 1,3,5-trimethyl-2,4,6-tris( 3,5-di-tert-butyl-4-hydroxybenzyl)benzene, dilaurylthiodipropionate (DLTDP), distearylthiodipropionate (DSTDP), tridecylphosphite (TDP), diphenyldecylphosphite (DPDP), triphenylphosphite (TPP) and tris-nonylphenylphosphite (TNP), and/or with an ultraviolate ray absorbing agent such as 2-hydroxy-4-methoxybenzopheone, 2-hydroxy-4-octoxybenzophenone, 2,4-dihydroxybenzophenone, 2(2'-hydroxy-5-methyl-phenyl) benzotriazole, substituted benzotriazole, 2-ethylhexyl-2-cyano-3,3'-diphenyl acrylate, ethyl-2-cyano-3,3'-dipehnyl acrylate, phenyl salicylate, and 4-t-butylphenyl salicylate. When used, these additives are preferably used in an amount of not more than 1 weight percent of the total wax emulsion.

There may be also added some polymer emulsion in order to improve water resistance and water proofness. Such a polymer emulsion should have a minimum film-forming temperature of −15–85° C. and is an aqueous emulsion of a polar vinyl homopolymer or copolymer, specific examples of which include acrylic acid ester, methacrylic acid ester, vinyl ester and homopolymers or copolymers of acrylonitrile, acrylic acid, methacrylic acid and styrene monomers. More specific examples include methylacrylate, ethylacrylate, butylacrylate and 2-ethylhexylacrylate, methylmethacrylate, ethylmethacrylate, butylmethacrylate and 2-ethylhexylmethacrylate, and homopolymers or copolymers of vinyl acetate, acrylonitrile, acrylic acid, methacrylic acid and styrene monomers. To these polymer emulsions may be further added self-cross-linking modified polymers.

The emulsification of waxes is most commonly accomplished by bringing together an aqueous phase with a dissimilar hydrocarbon phase containing wax, with the aid of wetting agents and a metallic soap. The emulsification may be effected by any suitable known methods, for example a mechanical method and a phase inversion method, both of which may be co-used. The mechanical methods rely on the use of a homomixer, homogenizer, colloid mill and supersonic wave, any of which may be used as long as there may be obtained a homogeneous wax emulsion. In one preferred embodiment, the components are introduced to a high shear mixing device where the dissimilar components are brought together under shear and pressure forces resulting in an emulsion. Temperatures for emulsification are not particularly limited, but are preferably about 60–65° C. for polybutadiene and polybutene and about 70°–75° C. for polyisobutylene, so as to avoid solids precipitation and maintain suitably low liquid viscosity. The finished emulsion may be further treated to control foam and specified viscosities with other chemical agents.

According to one embodiment, the manufacture of the emulsifier is accomplished by bringing together in a mixing vessel, preferably a vessel capable of being heated internally to a temperature of about 185° F., by weight, 92.6 percent water, 3 percent of an acid component consisting of any 16 to 20 carbon chain fatty acid, e.g., octadecanoic acid, and 3.8 percent of a basic amine structure of the desired reactivity, i.e., diethanolamine, triethanolamine or 2-amino-2-methyl-1-propanol, and an additional waterproofing medium, siloxane at 0.6 percent. While stirring, the vessel temperature is raised to the melting point of the highest melting component and held for 5–10 minutes under agitation until ionization occurs. The emulsifier concentrate is cooled to 135° F. and pumped to storage.

The wax component is prepared by adding, by weight, 8–10 percent of a naphthenic oil, having a viscosity between 40 and 5000 SUS @ 100° F. to a paraffinic slack wax having an oil content of 5–8 percent with a target value of 15 percent oil content in the finished wax blend. The blend is stirred under temperature 5 degrees above the melting point of the wax in a heated vessel and pumped to heated storage.

Forty-five percent by weight of the concentrated emulsifier and 55 percent of the wax blend are added through a continuous circulating mill capable of providing both shear forces and back pressure, e.g., a colloid mill, at a temperature equal to the wax melting point temperature plus 10° F. The mixture is circulated until stable emulsion occurs. The mixture is then cooled to 100° F. and an additional quantity of water is added under agitation to result in a programmed or desired viscosity and solids content. The usual addition is 5–15 percent of the production batch by weight.

The final emulsion product may then be subjected to various testing including viscosity, using, for example, the Brookfield Viscosity Test, weight, solids content and pH. The above described formulation will generally yield emulsions with the following characteristics: viscosity of 190–200 centipoises (Brookfield #2 spindle at 50 RPM and 77° F.); pH of 9.0; 48–52% solids; and weight of 8 lbs/gal.

The largest volume use for wax emulsions is in the water resistant gypsum, particle and fiber board industries where the wax emulsion is sprayed and mixed with the wood fibers or particles, sometimes with an accompanying resin, prior to pressing to a finished board structure. The OSB (orientated strand board) industry also uses emulsions to mix with proprietary resins and to coat wood strands or chips prior to pressing into a board similar to conventional plywood. The wax emulsion imparts water resistance and density to the finished product.

Slack wax emulsions in higher solids concentration which comprise polymers described above are also used to edge seal stacks of finished product prior to shipping.

Other applications include but are not exclusive to, newly assembled automobiles as a finished protector, coatings for vegetables and eggs, fine paper, and many others.

The invention will be further described, but not limited, by way of the following examples.

EXAMPLES

Materials
 Naphthenic oil samples (Ergon Vicksburg):
 L 60, 100, 500, 2500;
 H 60, 100, 500, 2000.
 Wax sample (Ergon West Virginia): Slack Wax (~10% oil content).

Example 1

Standard sample formulations are prepared by blending 25 volume % of H 100 with 75 volume % of H 500 in a container. The resulting viscosity should be approximately 150 SUS @ 100° F.±10 SUS @ 100° F. The slack wax sample is liquefied by placing the container in a water bath at ~150° F. The liquid contents are divided into 4 parts (approximately 950cc each). To one component portion of the divided wax sample (~950cc) is added an additional 5% by weight of the blended H oil material and allow to cool to a solidified state.

In a suitable vessel capable of being heated to 160–180° F., the following components are added, by weight %:

a. 52.9% slack wax/oil blend
b. 43% untreated water
c. 2.2% triethynolamine
d. 1.74% steric acid
e. The remainder is not to be added unless necessary, ammonium sulfate preferably not in excess of 0.03% and a defoaming agent such as 250/350 cs (centistoke) of Dow Corning silicone preferably in an amount not in excess of 0.2%.

The component mixture is brought slowly up to 160–180° F. while stirring until all components are liquid and in a stirred phase condition. The phased solution is introduced into a high speed shearing device and mixed until a white homogenous mixture results. The contents are then poured into an open vessel and cooled to 80° F.±5° F.

The cooled samples are tested as follows:
 PH (ASTM D 664) (9–9.5 desired range indicates stability)
 Viscosity Brookfield #3 spindle @ 55 RPM
 Evaporative solids, weight % (55%+preferred)
 Cold Temperature Stability (refrigerate to 35° F.±5° F. or 1 hour and observe any separation).
 High Temperature Stability (slowly heat to 90° F.±5° F. and hold for 1 hour and observe any separation).

The above steps are repeated for the other portions without the addition of any oil, using a neat slack wax sample unadditized with the naphthenic oil component. Comparative testing and observations are made with the standard.

Example 2

In order to measure the effect of viscosity and differing crude sources on emulsion characteristics, the blended oil is replaced with the 'neat' oil samples (Ergon supplied naphthenic oil samples) identified as L 60-2500 and H 60-2000, respectively. Tests and observed characteristics are made against the standard and reported.

Example 3

Wax Emulsion Test Matrix
 Target formulation (in grams/additive)

| | |
|---|---|
| Wax with 5% selected naphthenic oil additive | 317.4 g |
| Specified amine | 13.2 g |
| Specified acid | 10.4 g |
| Defoamer | 1.2 g |
| Water | 258.0 g |

Sample 1—258.03 grams of water was heated to 140° F. with 10.37 grams of 99% stearic acid stirred into solution with the addition of 13.17 grams of triethynolamine. The mixture was heated to a temperature of 175° F., which was held until hydration occurred. 317.02 grams of wax at a temperature of 175° F. was then added under high shear agitation to form an emulsion. The resulting emulsion exhibited a pH of 8.8, a viscosity of 700 and a solids content of 56.2% (the viscosity of the oil additive was 150 SUS @ 100° F.).

Sample 2—299.99 grams of water was reacted with 13.17 grams of TEA and 10.37 grams of stearic acid 99% at 170° F. This mixture was introduced to 317.35 grams of wax containing 5% of a naphthenic oil having a viscosity of 500 SUS @ 100° F. The resulting emulsion was smooth, had a pH of 9.1 and a viscosity of 1300 with a solids content of 58.7%.

Sample 3—258.03 grams of water was reacted with 13.19 grams of TEA and 10.39 grams of stearic acid at 170° F. and introduced to 317.23 grams of wax containing 5% of a naphthenic oil having a viscosity of 2,500 SUS @ 100° F. The resulting emulsion exhibited a pH of 8.9, a viscosity of 1380, and a solids content of 56%. The emulsion was smooth.

Samples 1,2, and 3 all exhibited thixotropic tendencies upon agitation.

Test evaluations were repeated using diethynolamine (DEA) and AMP with wax additized with 5% of 150 SUS @ 100° naphthenic oil resulting in emulsions with pH values above 9.0. These investigations demonstrated the successful application of a wide variety of different volatility amine systems with conventional stearic acid systems.

Modifications to the procedures in sample 1 were made (sample 16) where the emulsifier was preformed using 322.5 grams of water, 10.55 grams of stearic acid, and 13.27 grams of any of the amines, reacted at 175° F., cooled and held at 140° F. Wax containing 5% of a 150 SUS @ 100° F. naphthenic oil was melted and held at 140° F. The individual systems were brought together at the cooled temperature to form a stable and smooth emulsion. The formed emulsion was further cooled to 100° F. where an additional 100 grams of water was added to adjust the viscosity. The resulting modified procedure yielded an emulsion with a pH of 9.18, a viscosity of 296 cps, and a solids of 53%.

The modification demonstrates that viscosity adjustments can be made to the invert system without affecting any of the properties needed by the industry to which the emulsion might be applied.

I claim:

1. An inverse wax emulsion having thixotropic properties comprising a slack wax, an emulsifier; and a naphthenic oil.

2. The wax emulsion of claim 1, wherein said slack wax is derived from waxy lube distillates and has an inherent oil content of not more than 10 percent by weight.

3. The wax emulsion of claim 1, wherein said naphthenic oil is derived from crude distilled feedstock.

4. The wax emulsion of claim 3, wherein said naphthenic oil has a viscosity index of less than about 80.

5. The wax emulsion of claim 4, wherein said naphthenic oil has a viscosity index of less than about 30.

6. The wax emulsion of claim 3, wherein said naphthenic oil is derived from the catalytic hydrogenation of a crude oil feed stock.

7. The wax emulsion of claim 6, wherein said crude feedstock is substantially free of paraffin.

8. The wax emulsion of claim 3, said emulsion comprising from about 5 to about 15 percent by weight of naphthenic oil.

9. The wax emulsion of claim 1, wherein the total oil content does not exceed about 20% by weight.

* * * * *